(12) United States Patent
Connor

(10) Patent No.: US 7,773,620 B2
(45) Date of Patent: Aug. 10, 2010

(54) METHOD, SYSTEM, AND PROGRAM FOR OVERRUN IDENTIFICATION

(75) Inventor: Patrick L. Connor, Portland, OR (US)

(73) Assignee: INTEL Corporation, Santa Clara, CA (US)

(*) Notice: Subject to any disclaimer, the term of this patent is extended or adjusted under 35 U.S.C. 154(b) by 1309 days.

(21) Appl. No.: 10/745,774

(22) Filed: Dec. 24, 2003

(65) Prior Publication Data

US 2005/0147110 A1 Jul. 7, 2005

(51) Int. Cl.
 *H04L 12/28* (2006.01)
(52) U.S. Cl. ....................................... 370/412
(58) Field of Classification Search .................. 370/412
 See application file for complete search history.

(56) References Cited

U.S. PATENT DOCUMENTS

| | | | | |
|---|---|---|---|---|
| 5,428,460 | A * | 6/1995 | Kabeya et al. | 358/451 |
| 5,790,522 | A | 8/1998 | Fichou et al. | |
| 6,122,279 | A | 9/2000 | Milway et al. | |
| 6,337,852 | B1 | 1/2002 | Desnoyers et al. | |
| 6,700,871 | B1 * | 3/2004 | Harper et al. | 370/235 |
| 7,007,099 | B1 * | 2/2006 | Donati et al. | 709/237 |
| 7,136,897 | B1 * | 11/2006 | Raghunandan | 709/206 |
| 2001/0055313 | A1 * | 12/2001 | Yin et al. | 370/466 |
| 2002/0099854 | A1 * | 7/2002 | Jorgensen | 709/249 |
| 2002/0194332 | A1 | 12/2002 | Connor | |
| 2003/0084184 | A1 * | 5/2003 | Eggleston et al. | 709/234 |
| 2004/0022245 | A1 * | 2/2004 | Forbes et al. | 370/392 |
| 2004/0160972 | A1 | 8/2004 | Tang et al. | |
| 2005/0053084 | A1 * | 3/2005 | Abrol et al. | 370/412 |

FOREIGN PATENT DOCUMENTS

| | | |
|---|---|---|
| EP | 1 168 722 | 1/2002 |
| WO | 03053009 | 6/2003 |

OTHER PUBLICATIONS

PCT International Preliminary Report on Patentability (IPRP), Jul. 6, 2006, for International Application No. PCT/US2004/043037.
Allman, M., V. Paxson, & W. Stevens, "TCP Congestion Control", *RFC 2581*, © 1999 The Internet Society.
Intel Corp., "Intel Pro/1000 T IP Storage Adapter: Bringing Gigabit Ethernet to Network Storage", *Intel Data Sheet*, © 2003 Intel Corporation.
Intel Corp., "iSCSI: The Future of Network Storage", © 2002 Intel Corporation, pp. 1-7.

(Continued)

*Primary Examiner*—Kevin C Harper
*Assistant Examiner*—Sai-Ming Chan
(74) *Attorney, Agent, or Firm*—Konrad Raynes & Victor LLP

(57) ABSTRACT

Provided are a method, system, and program for identifying overrun conditions in data reception, for example. As a receive buffer approaches capacity, received data packets may be truncated to a smaller size. For example, header information may be saved but payload data discarded. The truncated packets may be used to facilitate sending acknowledgments to trigger resending of lost or dropped packets.

30 Claims, 5 Drawing Sheets

OTHER PUBLICATIONS

Intel Corp., "Technical Specs: Intel PRO/1000 T IP Storage Adapter", [online], [Retrieved on Oct. 9, 2003], Retrieved from the Internet at <URL: http://www.intel.com/network/connectivity/resources/doc_library/tech_specs/spec_pro1000...>.

Kurmann, C., M. Muller, F. Rauch, & T.M. Stricker, "Speculative Defragmentation—A Technique to Improve the Communication Software Efficiency for Gigabit Ethernet," Proceedings on the Ninth International Symposium on High-Performance Distributed Computing, Aug. 2000, pp. 131-138.

PCT International Search Report and Written Opinion, Apr. 27, 2005, for International Application No. PCT/US2004/043037.

Sapuntzakis, C., A. Romanow, & J. Chase, "The Case for RDMA," [online], *Internet Draft*, Dec. 2000, Retrieved from the Internet at <URL: http://www.cs.duke.edu/art/publications/draft-csapuntz-caserdma-00.txt>.

First Office Action, Sep. 21, 2006, for counterpart GB Application No. GB0606755.7, 3 pp.

Amended claims dated Jan. 25, 2007 for R.O.C. Patent Application No. 93139792.

Amendment dated Nov. 26, 2009 for German Application No. 112004002544.3-31.

Office Action 1, Jul. 3, 2009, for Application No. DE112004002544.3-31, 4 pp.

Office Action 1, Jul. 3, 2009, for Application No. DE112004002544.3-31, 4 pp. [Translation].

* cited by examiner

METHOD, SYSTEM, AND PROGRAM FOR OVERRUN IDENTIFICATION

BACKGROUND OF THE INVENTION

1. Field of the Invention

The present invention relates to a method, system, and program for overrun identification in data transmission.

2. Description of the Related Art

In a network environment, a network adapter on a host computer, such as an Ethernet controller, Fibre Channel controller, etc., will receive Input/Output (I/O) requests or responses to I/O requests initiated from the host. Often, the host computer operating system includes a device driver to communicate with the network adapter hardware to manage I/O requests to transmit over a network. Data packets received at the network adapter are often stored in an available allocated packet buffer in the host memory. The host computer may implement a protocol to process the packets received by the network adapter that are stored in the packet buffer, and access any I/O commands or data embedded in the packet.

For instance, the computer may implement the Transmission Control Protocol (TCP) and Internet Protocol (IP) to decode and extract the payload data in the TCP/IP packets received at the network adapter. IP specifies the format of packets, also called datagrams, and the addressing scheme. TCP is a higher level protocol which establishes a virtual connection between a destination and a source. Another protocol, Remote Direct Memory Access (RDMA) establishes a higher level connection and permits, among other operations, direct placement of data at a specified memory location at the destination.

A device driver, application or operating system can utilize significant host processor resources to handle network transmission requests to the network adapter. One technique to reduce the load on the host processor is the use of a TCP/IP Offload Engine (TOE) in which the TCP/IP protocol related operations are implemented in the network adapter hardware as opposed to the device driver or other host software, thereby saving the host processor from having to perform the TCP/IP protocol related operations. The transport protocol operations include packaging data in a TCP/IP packet with a checksum and other information, and unpacking a TCP/IP packet received from over the network to access the payload or data.

Another transport protocol operation performed by a TOE may include acknowledging the receipt of packets. Packets may be lost or dropped due to a number of factors including network congestion and overburdened resources of the receiver. If the packet sender does not receive an acknowledgment that a packet has been properly received, the packet sender can resend the packet. In the TCP/IP protocol, for example, if the packet sender does not receive an acknowledgment within a particular time period, it is assumed that the packet has been lost and the unacknowledged packet is resent.

Because waiting for the expiration of acknowledgment timers can slow the overall flow of data through a network, additional techniques are often used to detect missing packets and speed up the resending of those missing packets. For example, in the TCP/IP protocol as discussed in the RFC (Request for Comment) 2581—"TCP Congestion Control", a Fast Retransmit procedure is described which takes advantage of the fact that in the TCP/IP protocol, packets in a message to be sent from a sender to a receiver over a network are typically sequentially ordered and each packet of the message is assigned a unique sequence number.

If the receiver receives a packet which is not expected, such as a packet that is out of sequential order, the sequence number of the last correctly received packet of that connection between the sender and receiver is reacknowledged by the receiver. This signals to the sender that either the packet order was changed or that a packet was lost. If the packets were all properly received but somewhat out of sequential order, the receiver can readily reorder the packets into correct sequential order. However, if the receiver acknowledges the same sequence number several times (typically 3 times), then the sender knows pursuant to the protocol that a simple reordering is unlikely and that the packet that followed the last acknowledged sequence number is likely lost. The sender can then resend the lost packet or packets. Various techniques may be used to resend the packets in an efficient manner such as the Fast Recovery algorithm as described in the above referenced 2581—"TCP Congestion Control".

The multiple reacknowledgements of the sequence number of the last correctly received packet of the connection, in accordance with the Fast Retransmit algorithm, acts as a negative acknowledgement, indicating that the subsequent packet of the sequence was lost or dropped. One benefit of the Fast Retransmit algorithm is that the sender can often be informed of a missing packet without waiting for acknowledgement timers to expire. As a consequence, dead time on a connection can often be reduced.

Notwithstanding, there is a continued need in the art to improve the efficiency of data transmission.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
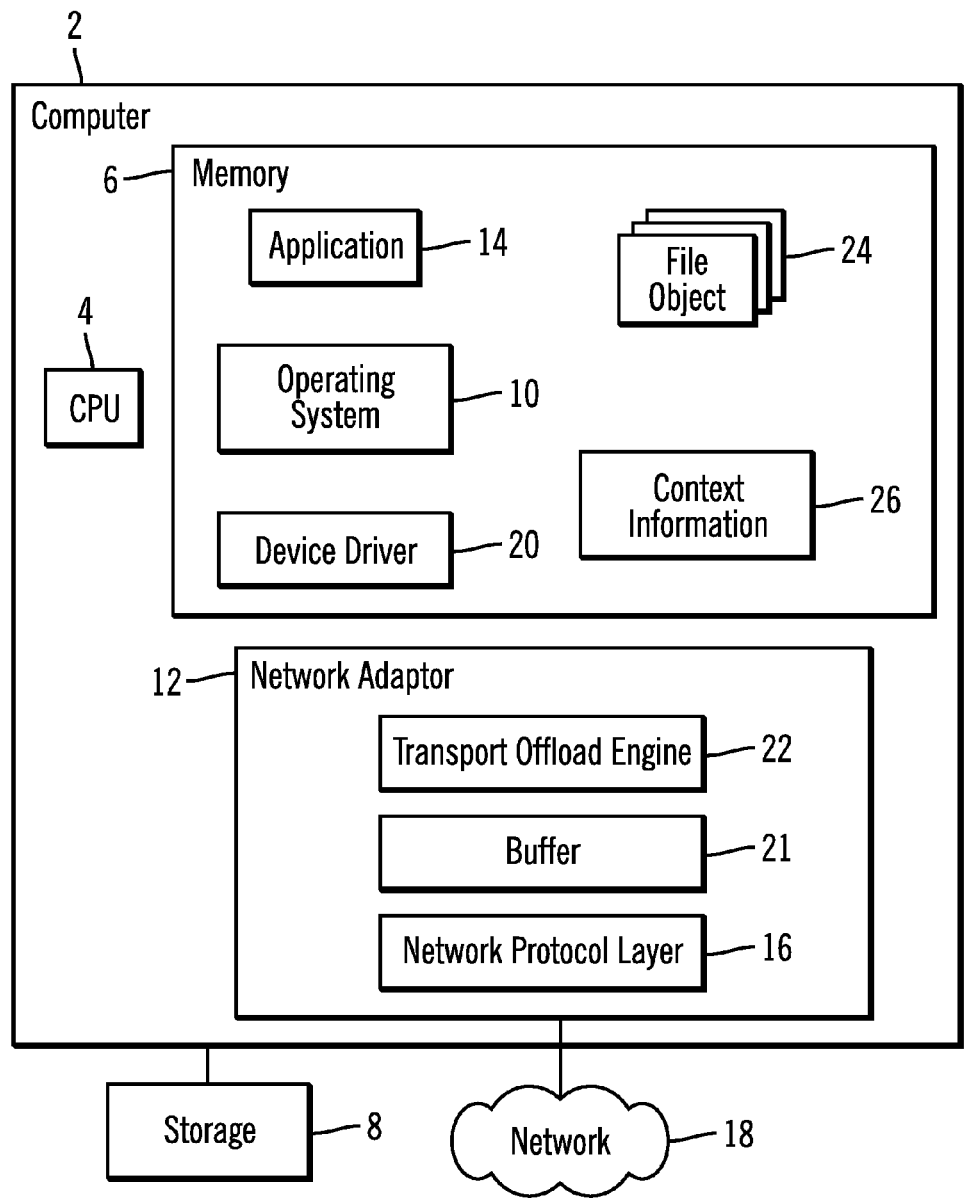
FIG. 1 illustrates a computing environment in which aspects of the invention are implemented.

FIG. 1 illustrates a computing environment in which aspects of the invention may be implemented. A computer 2 includes one or more central processing units (CPU) 4 (only one is shown), a volatile memory 6, non-volatile storage 8, an operating system 10, and a network adapter 12. An application program 14 further executes in memory 6 and is capable of transmitting and receiving packets from a remote computer. The computer 2 may comprise any computing device known in the art, such as a mainframe, server, personal computer, workstation, laptop, handheld computer, telephony device, network appliance, virtualization device, storage controller, network controller, etc. Any CPU 4 and operating system 10 known in the art may be used. Programs and data in memory 6 may be swapped into storage 8 as part of memory management operations.

The network adapter 12 includes a network protocol layer 16 to send and receive network packets to and from remote devices over a network 18. The network 18 may comprise a Local Area Network (LAN), the Internet, a Wide Area Network (WAN), Storage Area Network (SAN), etc. The embodiments may be configured to transmit data over a wireless network or connection, such as wireless LAN, Bluetooth, etc. In certain embodiments, the network adapter 12 and various protocol layers may implement the Ethernet protocol including Ethernet protocol over unshielded twisted pair cable, token ring protocol, Fibre Channel protocol, Infiniband, Serial Advanced Technology Attachment (SATA), parallel SCSI, serial attached SCSI cable, etc., or any other network communication protocol known in the art.

A device driver 20 executes in memory 6 and includes network adapter 12 specific commands to communicate with the network adapter 12 and interface between the operating system 10, applications 14 and the network adapter 12. In certain implementations, a network controller of the network adapter 12 includes a packet buffer 21 and a transport offload engine 22 as well as the network protocol layer 16. The network controller can control other protocol layers including a data link layer and a physical communication layer which includes hardware such as a data transceiver. In an embodiment employing the Ethernet protocol, the data transceiver could be an Ethernet transceiver.

In the illustrated embodiment, the network controller of the adapter 12 includes a transport protocol layer as well as a network protocol layer and other protocol layers. For example, the network controller of the adapter 12 implements a TCP/IP offload engine (TOE) 22, in which transport layer and security operations are performed within the offload engine 22 implemented within the network adapter 12 hardware or firmware, as opposed to the device driver 20.

The network layer 16 handles network communication and stores received TCP/IP packets in the packet buffer 21 prior to being processed by the transport offload engine 22. The adapter 12 further includes a data link layer which includes two sublayers: the Media Access Control (MAC) layer and the Logical Link Control (LLC) layer. The MAC sublayer controls how a computer on the network gains access to the data and permission to transmit it. The LLC layer controls frame synchronization, flow control and error checking. In the illustrated embodiment, the packet buffer 21 is located in the MAC portion of the network controller. It is appreciated that the buffer 21 may be located in other portions of the network adapter 12 as well as other portions of the computer 2.

The transport offload engine 22 interfaces with the device driver 20, or operating system 10 or application 14 and performs various transport protocol layer operations on the received packets. The operations include sending to the packet sender acknowledgments of the receipt of packets in accordance with the appropriate protocol. In addition, the engine 22 can process the content of messages included in the packets received at the network adapter 12 that are wrapped in a transport layer, such as TCP and/or IP, the Internet Small Computer System Interface (iSCSI), Fibre Channel SCSI, parallel SCSI transport, or any other transport layer protocol known in the art. The transport offload engine 22 can unpack the payload from the received TCP/IP packet and transfer the data to the device driver 20 to return to the driver 20, operating system 10 or application 14.

In certain implementations, the network controller and network adapter 12 can further include an RDMA protocol layer as well as the transport protocol layer. For example, the network adapter 12 can implement an RDMA offload engine, in which RDMA layer operations are performed within the offload engines of the RDMA protocol layer implemented within the network adapter 12 hardware, as opposed to the device driver 20, operating system 10 or applications 14. In various embodiments, the RMDA offload engines may be a part of the TOE 22 or a separate engine.

Thus, an application 14 transmitting messages over an RDMA connection can transmit the message through the device driver 20 and the RDMA protocol layer of the network adapter 12. The data of the message can be sent to the transport protocol layer of the engine 22 to be packaged in a TCP/IP packet. The transport protocol layer can further encrypt the packet before transmitting it over the network 18 through the network protocol layer 16.

The memory 6 further includes file objects 24, which also may be referred to as socket objects, which include information on a connection to a remote computer over the network 18. The application 14 uses the information in the file object 24 to identify the connection. The application 14 would use the file object 24 to communicate with a remote system. The file object 24 may indicate the local port or socket that will be used to communicate with a remote system, a local network (IP) address of the computer 2 in which the application 14 executes, how much data has been sent and received by the application 14, and the remote port and network address, e.g., IP address, with which the application 14 communicates. Context information 26 comprises a data structure including information the device driver 20, operating system 10 or application 14 maintains to manage requests sent to the network adapter 12 as described below.

Figure 2:
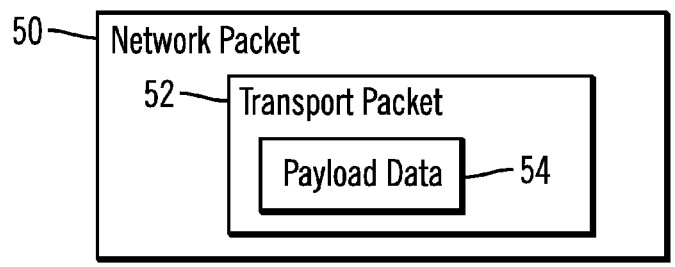
FIG. 2 illustrates a prior art packet architecture used with embodiments of the invention.

FIG. 2 illustrates a format of a network packet 50 received at the network adapter 12. The network packet 50 is implemented in a format understood by the network protocol 14, such as the IP protocol. The network packet 150 may include an Ethernet frame that would include additional Ethernet components, such as a header and error checking code (not shown).

A transport packet 52 is included in the network packet 50. The transport packet 52 is capable of being processed by the engine 22 in accordance with a transport protocol such as the TCP protocol. The packet 52 may be processed by other layers in accordance with other protocols including Internet Small Computer System Interface (iSCSI) protocol, Fibre Channel SCSI, parallel SCSI transport, etc. The transport packet 52 includes payload data 54 as well as other transport layer fields, such as a header and an error checking code. Included in the header of each packet is the packet sequence number. The payload data 52 includes the underlying content being transmitted, e.g., commands, status and/or data. The driver 20, operating system 10 or an application 14 may include a layer, such as a SCSI driver or layer, to process the content of the payload data 54 and access any status, commands and/or data therein.

Packets may be lost during transmission from a sender to a receiver of a particular connection due to network congestion or equipment failure at one or more points in the network path from the sender to the receiver. Furthermore, packets may be dropped by the receiver should one or more resources of the receiver become over burdened such that all of the incoming packets cannot be properly processed. As previously mentioned, data retransmission algorithms such as the Fast Retransmit algorithm provide for the receiver to send a duplicate acknowledgment of the last properly received packet in sequence when an out of sequence or otherwise unexpected packet is received. This duplicate acknowledgment signals to the sender that the subsequent packet may have been lost or dropped and should be resent if a sufficient number of duplicate acknowledgments are received.

However, it is appreciated herein that circumstances may arise in which loss of packets does not trigger data retransmission algorithms such as the Fast Retransmit algorithm. As a consequence, the sender may be caused to await the expiration of an acknowledgment timer prior resending the lost packets.

More specifically, events may cause not just a single packet to be lost or dropped but whole strings of packets forming a message segment can often be lost at a time. For example, if a network controller is lacking a required resource such as bus bandwidth or a host buffer, all received packets are likely to be dropped. Moreover, if a sufficiently large number of packets are dropped, the data sender may be caused to withhold sending any additional packets to the receiver until the acknowledgment timer of the sender has expired. If the sender is inhibited from sending additional packets, the receiver can be inhibited from sending duplicate acknowledgments which trigger the fast retransmit algorithm.

For example, various protocols such as the TCP/IP protocol employ a variety of techniques in an attempt to reduce network congestion and provide for a more fair utilization of network resources. One such technique is to impose upon the data sender a "send window" such as the "TCP send window" which limits the amount of data which the sender can send without receiving an acknowledgment of the proper receipt of previously sent data. Thus, once the data sender has reached the limit imposed by a TCP send window, the sender may not permitted by the connection protocol to send additional data until it receives additional acknowledgments from the connection receiver.

If a data sender has reached such a limit, and the unacknowledged data previously sent by the data sender is lost or dropped, it is appreciated herein that the sender may not receive any further acknowledgments from the receiver because the sent packets were lost or dropped and the sender is inhibited from sending any additional packets to the receiver. Conversely, if the receiver does not receive any additional packets following the loss of the string of packets, the receiver will not be triggered, in accordance with the Fast Retransmit algorithm, to send any duplicate acknowledgments to signal the data sender that packets were dropped. Lacking the receipt of the duplicate acknowledgments from the receiver, the data sender may not be notified of the loss of the packets until the expiration of the acknowledgment timer. As a consequence, the purpose of the fast retransmit algorithm may not be achieved in such situations.

Figure 3:
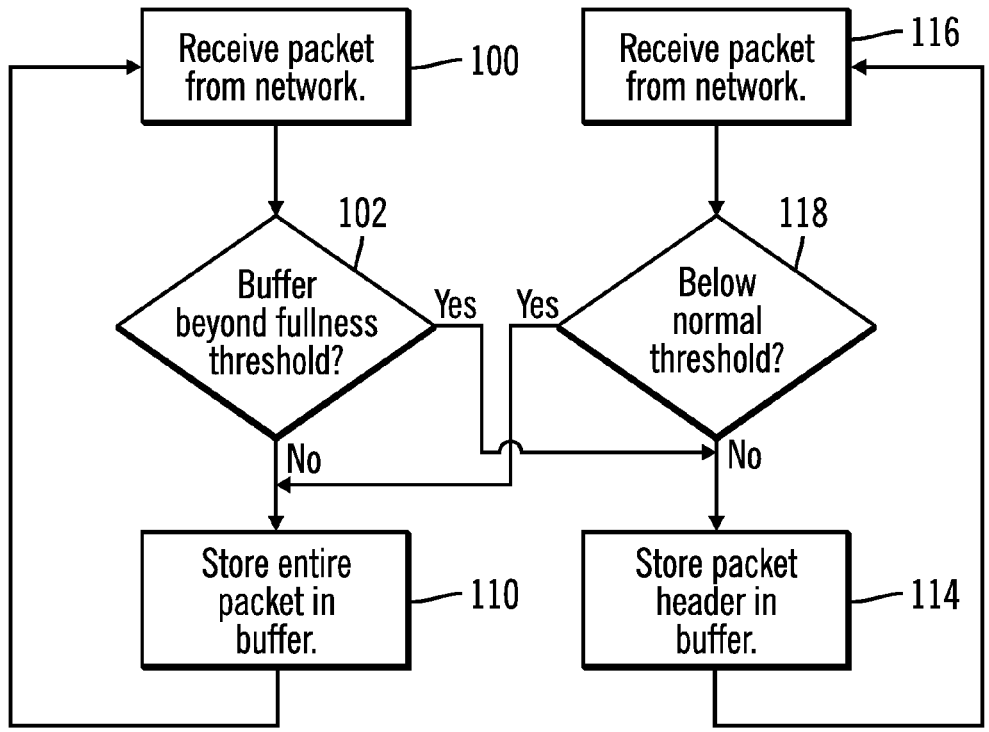
FIG. 3 illustrates operations performed to manage a receipt of data by a network adapter in accordance with embodiments of the invention.
Figure 5:
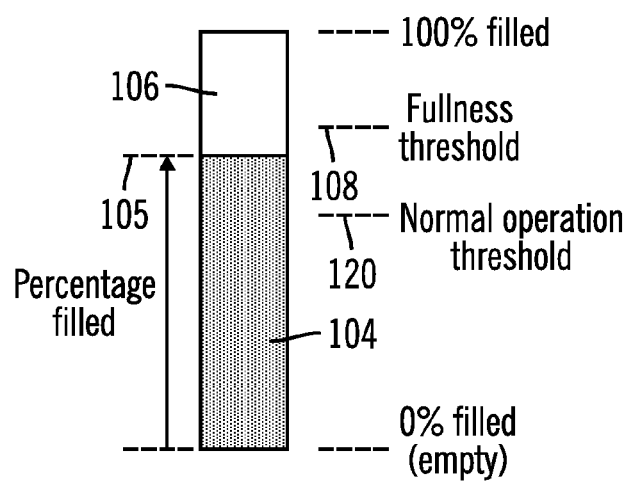
FIG. 5 illustrates thresholds used in operations performed to manage a receipt of data by the network adapter in accordance with embodiments of the invention.
Figure 4:
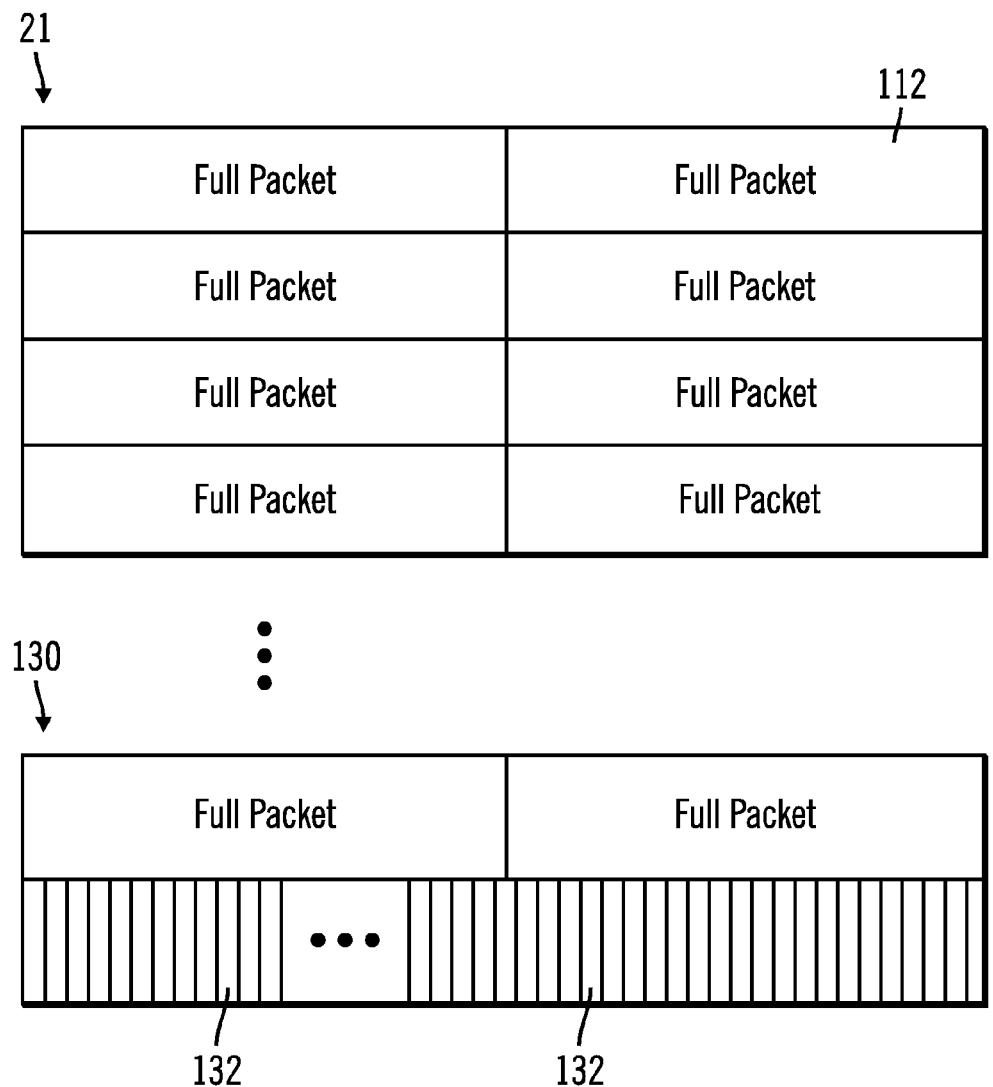
FIG. 4 illustrates a buffer used by the network adapter in accordance with embodiments of the invention.

FIG. 3 shows operations of a network adapter such as the network adapter 12 which can explicitly identify to a data sender which packets have been dropped, even where relatively large numbers of packets are dropped at a time. In this embodiment, the network protocol layer 16 receives (block 100) a packet from the network 18 and determines (block 102) whether the buffer 21 is filled beyond a particular "fullness" threshold. The packet buffer 21 is schematically shown in FIG. 4. A bar graph depicting the degree to which the buffer 21 is filled at any one particular time is depicted in FIG. 5 and is represented as a percentage of total capacity of the buffer 21 for storing packets received from the network 18. A cross-hatched portion 104 of the bar graph represents that portion of the buffer 21 which has been filled with data packets received from the network 16. Thus, the length of the portion 104 as indicated at 105 represents the stored data level of the buffer 21. The remaining portion 106 of the bar graph represents the remaining capacity of the buffer 21 which has not yet been filled with data packets from the network.

The bar graph of FIG. 5 also indicates at 108 a "fullness threshold." In the example of FIG. 5, the buffer 21 has been filled to a level 105 below that of the fullness threshold 108. As long as the filled level 105 remains below the fullness threshold 108, the network adapter 12 will continue to store (block 110, FIG. 3) the entire packet received from the network 18 into the buffer 21. FIG. 4 shows an example of a full packet 112 stored in the buffer 21.

The fullness threshold 108 may be used to provide an early indication that the buffer 21 is likely to run out of room to store data packets from the network 18. Once the buffer 21 runs out of storage space, any further received data packets are likely to be dropped. As long as the transport offload engine 22 can pull and process data packets from the buffer 21 at a rate which is the same or faster than the network protocol layer 16 stores data packets into the buffer 21, the filled level 105 of the buffer 21 should remain below the fullness threshold 108. However, if the network protocol layer 16 stores data packets into the buffer 21 at a rate faster than the transport offload engine 22 can process the data packets, the filled level 105 can begin to rise.

The rate at which the transport offload engine 22 processes data packets may be lower than the rate at which the network protocol layer 16 stores the data packets from the network 18 due to a number of factors. For example, the amount of data sent to the network adapter 12 from the network 18 may increase significantly. Also, resources needed by the transport offload engine 22 to process the data packets may become more scarce. For example, the bandwidth of the bus or busses available to connect the transport offload engine 22 to the rest of the host memory 6 or data storage 8 of the host computer 2 may narrow.

Once the filled level 105 exceeds (block 102) the fullness threshold 108, the network adapter 12 rather than storing the received data packets in full, can, in accordance with one embodiment, begin to truncate the received data packets, mark the truncated packets as truncated, and store (block 114) the remaining, truncated portion into the buffer 21. For example, in truncating the received data packets, the header information may be retained and the payload data discarded. As a consequence, the truncated data packet may be substantially reduced in size as compared to the full data packet as received. If a packet is received that does not have header information useful for generating acknowledgments, that packet could be discarded rather than truncated in this example.

Each additional packet received (block 116) from the network 18, will be stored (block 114) in truncated form in the buffer 21 as long as it is determined (block 118) that the filled level 105 exceeds a "normal operation" threshold 120 (FIG. 5). As explained in greater detail below, storing truncated data packets rather than full data packets when the fullness threshold 108 is exceeded can facilitate, for example, rapid retransmittal of dropped packets.

Figure 6:
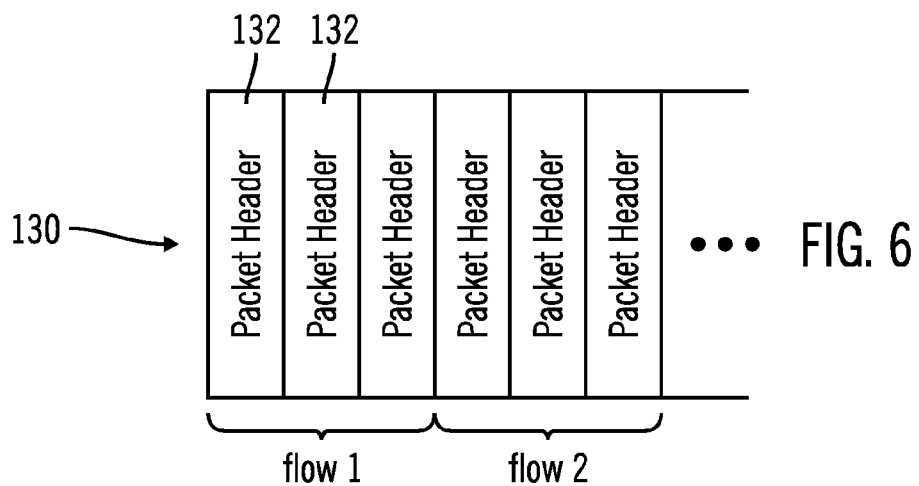
FIG. 6 illustrates a portion of a buffer used by the network adapter in accordance with embodiments of the invention.

FIG. 4 indicates a portion 130 (an enlargement of which is shown in FIG. 6) in which packet headers 132 are stored rather than full packets 112. In this example, the buffer 21 is a 256K byte FIFO (first-in-first-out) buffer and the fullness threshold 108 may be set to indicate that the buffer 21 has 4 K bytes of FIFO space remaining. In some applications, two full size packets 112 can consume the remaining 4 K bytes of FIFO storage. In the illustrated embodiment, the amount of storage space consumed by a packet truncated down to the header information, for example, can be reduced substantially, such as to about 60 bytes, for example. Thus, in the remaining 4 K bytes of storage space, many more truncated packets, such as about 68 truncated packets for example, can be stored in the space which as few as two full packets may have otherwise occupied. As a consequence, these packets which would have otherwise likely been dropped entirely, can be stored in a truncated form to facilitate early retransmission as described below.

In the illustrated embodiment, the normal operation threshold 120 is set substantially below that of the fullness threshold 108. It is appreciated that these thresholds may be set at a variety of levels, depending upon the application. Moreover, the fullness threshold 108 can be set equal to that of the normal operation threshold 120 to simply the logic operations.

Figure 7:
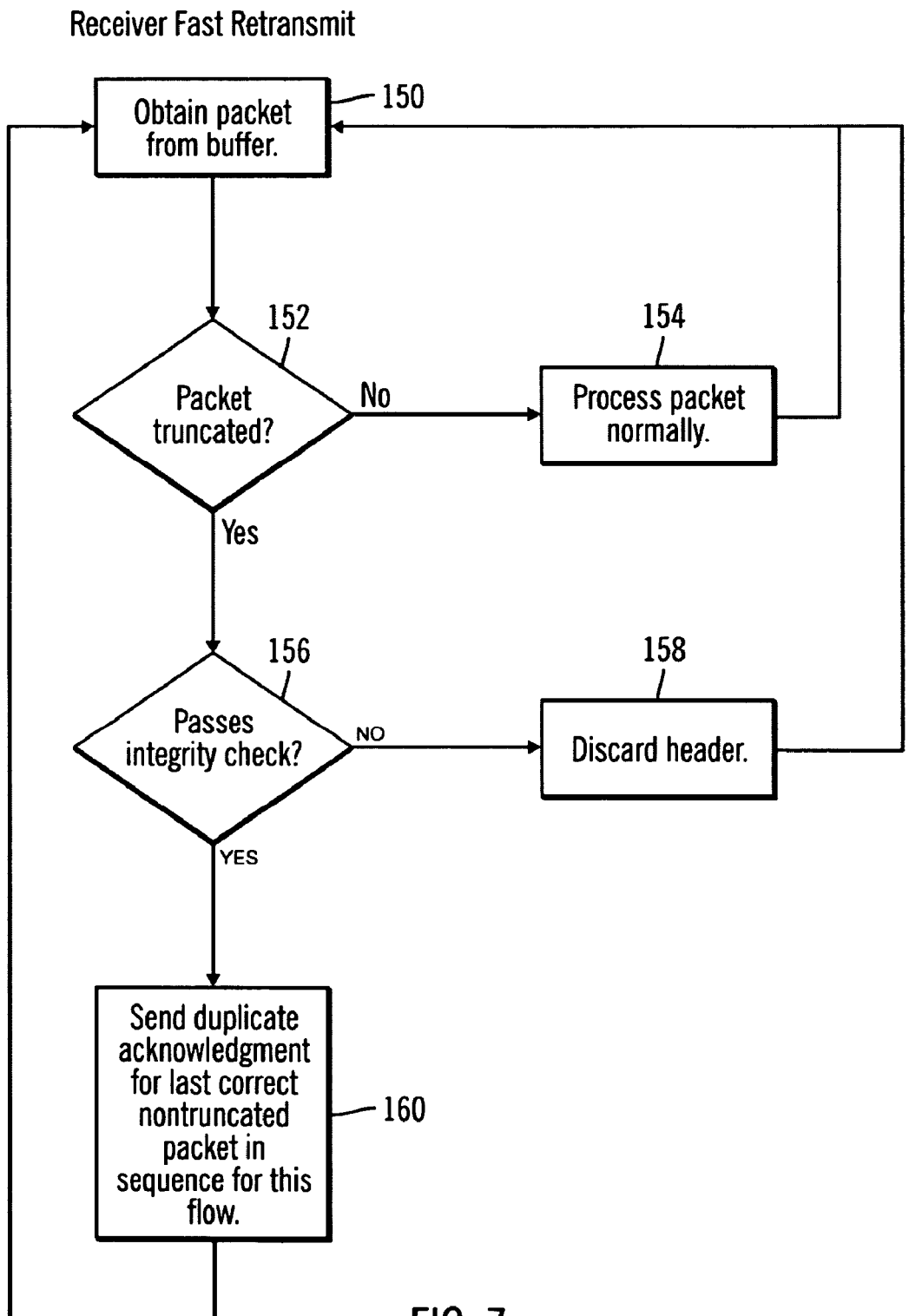
FIG. 7 illustrates operations performed to manage processing of received data in accordance with embodiments of the invention.

FIG. 7 shows operations of a network adapter such as the network adapter 12 which could include a connection protocol layer including a transport offload engine 22, in processing the data packets which were received by the network protocol layer 16 from the network 18 and stored in the buffer 21. The adapter 12 obtains (block 150) a data packet from the buffer 21 and determines (block 152) whether the packet has been marked as truncated in a manner similar to that described above in connection with FIG. 3. If not, the network adapter 12 processes (block 154) the data packet in the usual fashion.

As previously mentioned, this normal processing may include decoding and extracting the payload data in the packets and sending an acknowledgement to the data sender in accordance with the appropriate protocol. For example, in the Fast Retransmit procedure, if the data packet being processed is the next packet in sequence for a particular connection, the sequence number of that packet is acknowledged back to the sender. However, if the receiver receives a packet which is not expected, such as a packet that is out of sequential order, the sequence number of the last correctly received packet of that connection between the sender and receiver is reacknowledged by the receiver. This signals to the sender that either the packet order was changed or that a packet was lost.

The data packets received by the network adapter 12 during any one interval may be from several different connections between the network adapter 12 and one or more senders in the network 18. Hence, the data packets stored in the buffer 21 may each be a part of one or more different flows of packets between the network adapter 12 and one or more different senders. Hence, when acknowledging a received packet, the network adapter 12 determines to which flow of packets the received packet belongs and whether the sequence number of the received packet is the expected sequence number of that particular flow. If expected, the received packet is acknowledged. If unexpected, the last correctly received packet of that flow of packets between the sender and receiver is reacknowledged by the receiver.

If it is determined (block 152) that the data packet is truncated, an integrity test (block 156) may be performed on the truncated data packet. Such an integrity test may include for example, one or more of TCP, IP header checksums, and an Ethernet CRC (cyclic redundancy check). If the truncated data packet does not pass the integrity test, the truncated packet may be discarded (block 158).

If the truncated data packet does pass the integrity test (block 156), the network adapter can examine the header information of the truncated data packet to determine to which flow the received truncated data packet belongs and the sequence number of that received truncated data packet within the identified flow. Using this header information, the network adapter may send a duplicate acknowledgement (block 160) of the last correctly received full packet of that flow between the sender and the network adapter 12. This process is continued with the network adapter obtaining (block 150) another packet from the buffer 21, determining (block 152) whether the packet was truncated, testing (block 156) the truncated packet and sending a duplicate acknowledgement (block 160) of the last correctly received full packet of that connection between the sender and the network adapter 12.

It is appreciated that by truncating the received data packets when it appears that the capacity of the receive buffer 21 may be shortly exceeded, the header information for a number of packets may be preserved which could otherwise be lost because there is insufficient room in the receiver buffer 21 to store full data packets. This header information may be used to generate reacknowledgments to trigger a fast retransmit procedure. Thus, these reacknowledgments may be useful in various circumstances such as for example, when the sender is inhibited from sending additional data packets because, for example, the sender's send window has been reached. As a result, the likelihood that a sufficient number of reacknowledgments can be generated to trigger a fast retransmit for a particular flow, can be improved. Moreover, by truncating the data packets to store primarily the packet header information, a relatively large number of truncated packets can be stored in a relatively small space. Hence, truncated packets may be successfully stored for a number of different data flows as indicated as flow1, flow2 . . . etc in FIG. 6. Thus, the likelihood that a sufficient number of reacknowledgments can be generated to trigger a fast retransmit for more than one flow, can be improved as well.

Additional Embodiment Details

The described techniques for processing received data in a network adapter or network interface card may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, the transport offload engine was described as performing various transport layer operations in accordance with the TCP/IP Protocol. In alternative embodiments, data may be transmitted from a remote host to the host using other protocols. As such, a communication protocol offload engine such as the transport offload engine 22 would perform some or all of those transmission operations including fragmented data reassembly or data payload extraction in accordance with such other transmission protocols.

In the described embodiments, certain operations were described as being performed by the device driver 20 and transport offload engine 22. In alterative embodiments, operations described as performed by the device driver 20 may be performed by the transport offload engine 22, and vice versa. In the described implementations, the transport protocol layer was implemented in the network adapter 12 hardware which includes logic circuitry separate from the central processing unit or units 4 of the host computer 2. In alternative implementations, portions of the transport protocol layer may be implemented in the device driver or host memory 6.

In the described embodiments, various protocol layers and operations of those protocol layers were described. The operations of each of the various protocol layers may be implemented in hardware, firmware, drivers, operating systems, applications or other software, in whole or in part, alone or in various combinations thereof.

In certain implementations, the device driver and network adapter embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. Such computer systems often include a desktop, workstation, server, mainframe, laptop, handheld computer, etc. In alternative implementations, the network adapter embodiments may be included in a system that does not include a storage controller, such as certain hubs and switches.

In certain implementations, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 3 and 7 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In certain implementations, the buffer 21 used by the network adapter 12 was described as being separate from the host memory 6 and being physically located in the adapter 12. In other embodiments, the buffer 21 may be a part of the host memory 6 or a part of other controller circuits on a separate card or on a motherboard.

Figure 8:
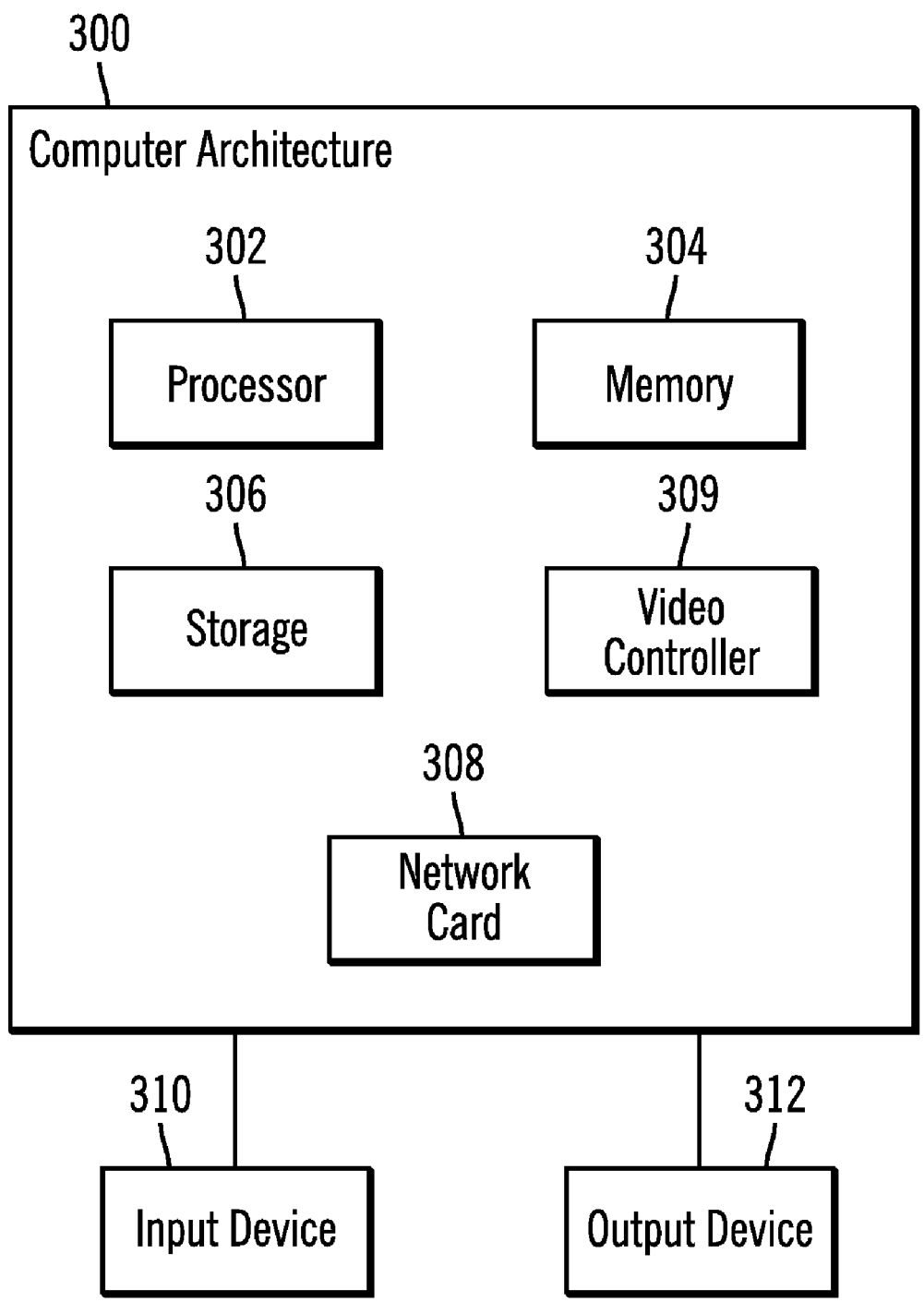
FIG. 8 illustrates an architecture that may be used with the described embodiments.

FIG. 8 illustrates one implementation of a computer architecture 300 of the network components, such as the hosts and storage devices shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network, such as an Ethernet, a Fibre Channel Arbitrated Loop, etc. Further, the architecture may, in certain embodiments, include a video controller 309 to render information on a display monitor, where the video controller 309 may be implemented on a video card or integrated on integrated circuit components mounted on the motherboard. As discussed, certain of the network devices may have multiple network cards. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The network adapter 12, 308 may be implemented on a network card, such as a Peripheral Component Interconnect (PCI) card or some other I/O card, or on integrated circuit components mounted on the motherboard.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, executed by a processor, comprising:
   receiving data packets from a network wherein each received data packet includes a header and a payload in accordance with the Internet Protocol (IP) network protocol for packet transport over the network;
   determining the remaining storage capacity of a receive buffer adapted to store a plurality of data packets;
   storing the received data packets in the receive buffer if the remaining storage capacity of the receive buffer for storing additional data packets is above a first threshold;
   truncating the received data packets by discarding payloads while retaining the headers of the packets to form truncated packets each having a header but lacking the payload discarded from the packet if the remaining storage capacity of the receive buffer for storing additional data packets is below the first threshold; and
   storing the truncated data packets in the receive buffer if the remaining storage capacity of the receive buffer for storing additional data packets is below the first threshold.

2. The method of claim 1 further comprising marking the truncated packet as truncated.

3. The method of claim 1 wherein packets are received from a sender, the method further comprising informing the sender which packets sent by the sender were truncated.

4. The method of claim 1 wherein packets are received from a sender which sends data packets in a sequentially ordered flow of data packets, said method further comprising examining the data packets stored in the receive buffer and sending an acknowledgment for each nontruncated packet received in sequential order from the sender and, sending a duplicate acknowledgment of the last nontruncated packet received in sequential order.

5. The method of claim 1 wherein packets are received from a plurality of senders in a plurality of flows in which each sender sends data packets in a sequentially ordered flow of data packets, said method further comprising examining the data packets stored in the receive buffer and sending an acknowledgment for each nontruncated packet received in sequential order from the sender of the associated flow and, sending a duplicate acknowledgment of the last nontruncated packet received in sequential order from the sender of the associated flow.

6. The method of claim 4 wherein said examining includes performing an integrity check on each truncated packet and refraining from sending a duplicate acknowledgment if the truncated packet does not pass the integrity check.

7. The method of claim 6 wherein said integrity check includes performing a checksum test.

8. A non-transitory article comprising a storage medium, readable by a processor, the storage medium comprising processor readable instructions stored thereon to:
receive data packets from a network wherein each received data packet includes a header and a payload in accordance with the Internet Protocol (IP) for packet transport over the network;
determine the remaining storage capacity of a receive buffer adapted to store a plurality of data packets;
store the received data packets in the receive buffer if the remaining storage capacity of the receive buffer for storing additional data packets is above a first threshold;
truncate the received data packets by discarding payloads while retaining the headers of the packets to form truncated packets each having a header but lacking the payload discarded from the packet if the remaining storage capacity of the receive buffer for storing additional data packets is below the first threshold; and
store the truncated data packets in the receive buffer if the remaining storage capacity of the receive buffer for storing additional data packets is below the first threshold.

9. The article of claim 8 wherein the storage medium further comprises machine readable instructions stored thereon to mark the truncated packet as truncated.

10. The article of claim 8 wherein packets are received from a sender, and the storage medium further comprises machine readable instructions stored thereon to inform the sender which packets sent by the sender were truncated.

11. The article of claim 8 wherein packets are received from a sender which sends data packets in a sequentially ordered flow of data packets, and the storage medium further comprises machine readable instructions stored thereon to examine the data packets stored in the receive buffer and send an acknowledgment for each nontruncated packet received in sequential order from the sender and, send a duplicate acknowledgment of the last nontruncated packet received in sequential order.

12. The article of claim 8 wherein packets are received from a plurality of senders in a plurality of flows in which each sender sends data packets in a sequentially ordered flow of data packets, and the storage medium further comprises machine readable instructions stored thereon to examine the data packets stored in the receive buffer and send an acknowledgment for each nontruncated packet received in sequential order from the sender of the associated flow and, send a duplicate acknowledgment of the last nontruncated packet received in sequential order from the sender of the associated flow.

13. The article of claim 11 wherein said machine readable instructions to examine include machine readable instructions stored on the storage medium to perform an integrity check on each packet and refrain from sending a duplicate acknowledgment if the packet does not pass the integrity check.

14. The article of claim 13 wherein the machine readable instructions to perform an integrity check include machine readable instructions stored on the storage medium to perform a checksum test.

15. A system for use with a network, comprising:
at least one memory which includes an operating system and a receive buffer adapted to store a plurality of data packets;
a processor coupled to the memory;
a network controller;
data storage;
a data storage controller for managing Input/Output (I/O) access to the data storage; and
a device driver executable by the processor in the memory, wherein at least one of the operating system, device driver and the network controller is adapted to:
receive data packets from a network wherein each received data packet includes a header and a payload in accordance with the Internet Protocol (IP) for packet transport over the network;
determine the remaining storage capacity of a receive buffer;
store the received data packets in the receive buffer if the remaining storage capacity of the receive buffer for storing additional data packets is above a first threshold;
truncate the received data packets by discarding payloads while retaining the headers of the packets to form truncated packets each having a header but lacking the payload discarded from the packet if the remaining storage capacity of the receive buffer for storing additional data packets is below the first threshold; and
store the truncated data packets in the receive buffer if the remaining storage capacity of the receive buffer for storing additional data packets is below the first threshold.

16. The system of claim 15, wherein at least one of the operating system, device driver and the network controller is adapted to mark the truncated packet as truncated.

17. The system of claim 15 wherein packets are received from a sender, and at least one of the operating system, device driver and the network controller is adapted to inform the sender which packets sent by the sender were truncated.

18. The system of claim 15 wherein packets are received from a sender which sends data packets in a sequentially ordered flow of data packets, and at least one of the operating system, device driver and the network controller is adapted to examine the data packets stored in the receive buffer and send an acknowledgment for each nontruncated packet received in sequential order from the sender and, send a duplicate acknowledgment of the last nontruncated packet received in sequential order.

19. The system of claim 15 wherein packets are received from a plurality of senders in a plurality of flows in which each sender sends data packets in a sequentially ordered flow of data packets, and at least one of the operating system, device driver and the network controller is adapted to examine the data packets stored in the receive buffer and send an acknowledgment for each nontruncated packet received in sequential order from the sender of the associated flow and, send a duplicate acknowledgment of the last nontruncated packet received in sequential order from the sender of the associated flow.

20. The system of claim 18 wherein said examining includes performing an integrity check on each truncated packet and refraining from sending a duplicate acknowledgment if the truncated packet does not pass the integrity check.

21. The system of claim 20 wherein said integrity check includes performing a checksum test.

22. The system of claim 15 for use with an unshielded twisted pair cable, said system further comprising an Ethernet data transceiver coupled to said network controller and said cable and adapted to transmit and receive data over said cable.

23. The system of claim 15 further comprising a video controller coupled to said processor.

24. A device, including a processor, for use with a network and a receive buffer adapted to store a plurality of data packets, comprising:

means for receiving data packets from a network wherein each received data packet includes a header and a payload in accordance with the Internet Protocol (IP) network protocol for packet transport over the network;

means for determining the remaining storage capacity of a receive buffer; means for storing the received data packets in the receive buffer if the remaining storage capacity of the receive buffer for storing additional data packets is above a first threshold;

means for truncating the received data packets by discarding payloads while retaining the headers of the packets to form truncated packets each having a header but lacking the payload discarded from the packet if the remaining storage capacity of the receive buffer for storing additional data packets is below the first threshold; and means for storing the truncated data packets in the receive buffer if the remaining storage capacity of the receive buffer for storing additional data packets is below the first threshold.

25. The device of claim 24 further comprising means for marking the truncated packet as truncated.

26. The device of claim 24 wherein packets are received from a sender, the device further comprising means for informing the sender which packets sent by the sender were truncated.

27. The device of claim 24 wherein packets are received from a sender which sends data packets in a sequentially ordered flow of data packets, said device further comprising means for examining the data packets stored in the receive buffer and sending an acknowledgment for each nontruncated packet received in sequential order from the sender and, sending a duplicate acknowledgment of the last nontruncated packet received in sequential order.

28. The device of claim 24 wherein packets are received from a plurality of senders in a plurality of flows in which each sender sends data packets in a sequentially ordered flow of data packets, said device further comprising means for examining the data packets stored in the receive buffer and sending an acknowledgment for each nontruncated packet received in sequential order from the sender of the associated flow and, sending a duplicate acknowledgment of the last nontruncated packet received in sequential order from the sender of the associated flow.

29. The device of claim 27 said means for examining includes means for performing an integrity check on each truncated packet and means for refraining from sending a duplicate acknowledgment if the truncated packet does not pass the integrity check.

30. The device of claim 29 wherein means for performing an integrity check includes means for performing a checksum test.

* * * * *

UNITED STATES PATENT AND TRADEMARK OFFICE
CERTIFICATE OF CORRECTION

| | | |
|---|---|---|
| PATENT NO. | : 7,773,620 B2 | Page 1 of 1 |
| APPLICATION NO. | : 10/745774 | |
| DATED | : August 10, 2010 | |
| INVENTOR(S) | : P. L. Connor | |

It is certified that error appears in the above-identified patent and that said Letters Patent is hereby corrected as shown below:

In the Claims:

Column 14, Line 29, "claim 27 said" should read --claim 27 wherein said--

Signed and Sealed this
Twelfth Day of May, 2015

Michelle K. Lee
*Director of the United States Patent and Trademark Office*